US011909690B2

(12) United States Patent
Taherzadeh Boroujeni et al.

(10) Patent No.: US 11,909,690 B2
(45) Date of Patent: Feb. 20, 2024

(54) FEEDBACK FOR BEAM CHANGES

(71) Applicant: QUALCOMM Incorporated, San Diego, CA (US)

(72) Inventors: Mahmoud Taherzadeh Boroujeni, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 17/224,893

(22) Filed: Apr. 7, 2021

(65) Prior Publication Data

US 2021/0367738 A1 Nov. 25, 2021

Related U.S. Application Data

(60) Provisional application No. 63/029,294, filed on May 22, 2020.

(51) Int. Cl.
*H04L 5/00* (2006.01)
*H04B 7/06* (2006.01)
*H04W 72/21* (2023.01)

(52) U.S. Cl.
CPC ......... *H04L 5/0055* (2013.01); *H04B 7/0623* (2013.01); *H04B 7/0695* (2013.01); *H04W 72/21* (2023.01)

(58) Field of Classification Search
CPC .... H04L 5/0055; H04W 72/21; H04B 7/0623; H04B 7/0695
See application file for complete search history.

(56) References Cited

U.S. PATENT DOCUMENTS

| | | | | |
|---|---|---|---|---|
| 2017/0207843 | A1* | 7/2017 | Jung | H04W 74/006 |
| 2018/0294937 | A1* | 10/2018 | Nagaraja | H04L 5/0048 |
| 2019/0199412 | A1* | 6/2019 | Koskela | H04B 7/063 |
| 2019/0313389 | A1* | 10/2019 | John Wilson | H04W 72/21 |
| 2021/0184814 | A1* | 6/2021 | Taherzadeh Boroujeni | |
| | | | | H04B 7/0695 |

OTHER PUBLICATIONS

R1-1718743 Ericsson "Analysis of beam indication signalling options" 3GPP WG1 #90bis Prague Oct. 9-13, 2017 (Year: 2017).*

(Continued)

*Primary Examiner* — Basil Ma
(74) *Attorney, Agent, or Firm* — ArentFox Schiff LLP

(57) ABSTRACT

A UE may be configured to receive, from a base station, a downlink transmission on a downlink data channel including data and an indication of a beam switch; transmit first ACK feedback to the base station in response to receiving the data; and transmit second ACK feedback to the base station in response to receiving the indication of the beam switch, the second ACK feedback being separate from the first ACK feedback. A base station may be configured to transmit, to a UE, a downlink transmission on a downlink data channel including data and an indication of a beam switch; receive first ACK feedback from the UE in response to transmitting the data; and receive second ACK feedback from the UE in response to transmitting the indication of the beam switch, the second ACK feedback being separate from the first ACK feedback.

30 Claims, 8 Drawing Sheets

(56) References Cited

OTHER PUBLICATIONS

International Search Report and Written Opinion—PCT/US2021/026427—ISA/EPO—dated Jun. 17, 2021.
Qualcomm Incorporated: "Potential Techniques for Coverage Enhancements", 3GPP TSG-RAN WG1 Meeting #101, 3GPP Draft, R1-2004499, 3rd Generation Partnership Project (3GPP), Mobile Competence Centre, 650, Route Des Lucioles, F-06921 Sophia-Antipolis Cedex, France, vol. RAN WG1. No. e-Meeting; May 25, 2020-Jun. 5, 2020, May 16, 2020 (May 16, 2020), 15 Pages, XP051886228, Retrieved from the Internet: URL: https://www.3gpp.org/ftp/TSG_RAN/WG1_RL1/TSGR1_101-e/Docs/R1-2004499.zip, R1-2004499, Potential techniques for coverage enhancement.docx [retrieved on May 16, 2020], paragraph [06.2].

\* cited by examiner

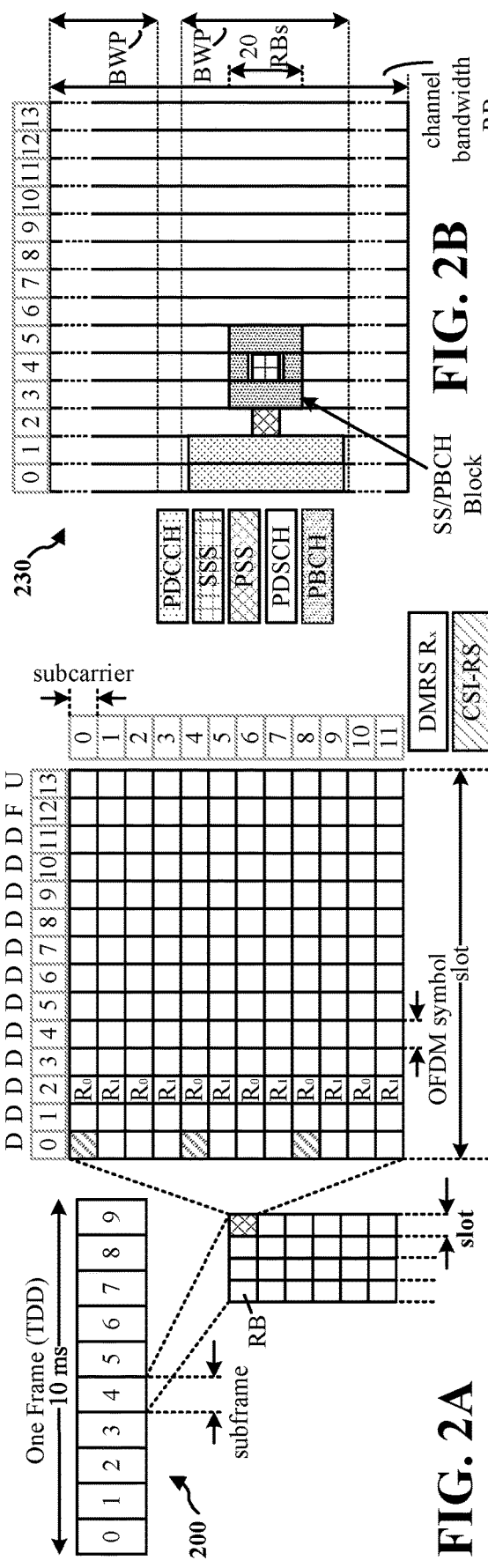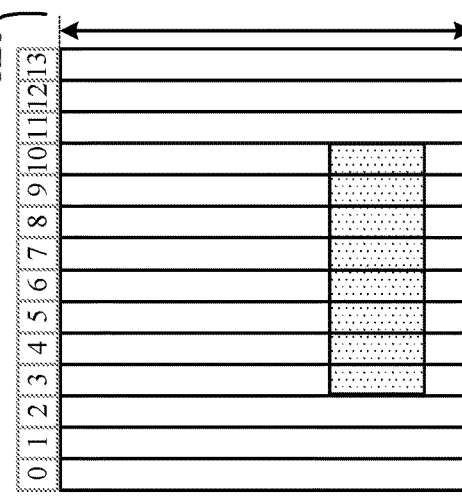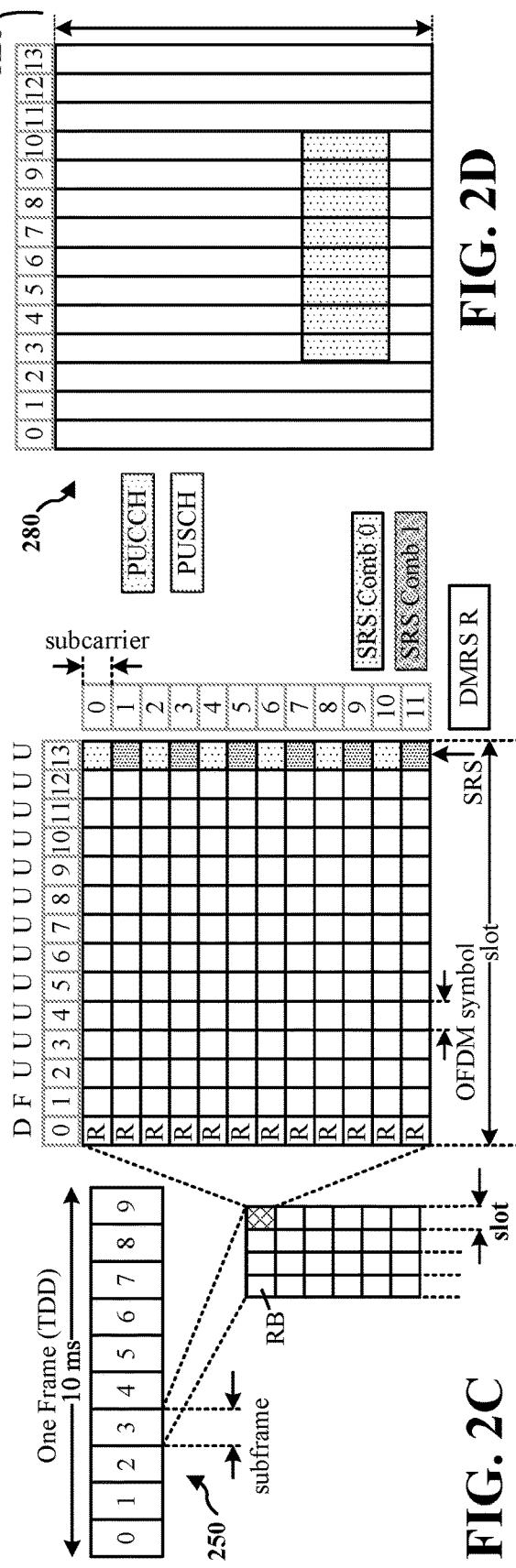
FIG. 2A
FIG. 2B
FIG. 2C
FIG. 2D

FEEDBACK FOR BEAM CHANGES

CROSS REFERENCE TO RELATED APPLICATION(S)

This application claims the benefit of U.S. Provisional Application Ser. No. 63/029,294, entitled "SYSTEM AND METHOD FOR BEAM CHANGE ACKNOWLEDGEMENT FEEDBACK" and filed on May 22, 2020, the disclosure of which is expressly incorporated by reference herein in its entirety.

BACKGROUND

Technical Field

The present disclosure generally relates to communication systems, and more particularly, to feedback in the context of as part of an exchange of information related to a change of a beam for communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various aspects, of the present disclosure, a base station may communicate with a user equipment (UE) using beamformed communication, such as in millimeter-wave (mmW) or near-mmW system. The base station may control the beams on which the base station and the UE communicate, such as by informing the UE of the beam of the base station that is on which the base station will use for communication with the UE. Responsive to being configured with information indicating the base station beam to use, the UE may select or activate or move to a complementary beam identified during beam training as forming a pair with the base station beam.

Communication on wireless channels, however, carries with it some level of inherent risk, as the random nature of wireless channels may lead to failure of some signals from a transmitter to a receiver. Where those signals carry information configuring a beam pair that the base station will use, failure of the UE to receive those signals may result in radio link failure or loss of timing synchronization, as the UE may be unaware of the configuration change and so may continue using a stale beam. Thus, a need exists to improve the reliability of acknowledging a beam change indication.

The present disclosure provides various techniques and solutions for improving the reliability of acknowledging a beam change indication, e.g., by transmitting the beam change indication on a downlink data channel, such as a physical downlink shared channel (PDSCH). For example, the base station may include the beam change indication in a medium access control (MAC) control element (CE) carried on the PDSCH. This beam change indication on the downlink data channel may be a repetition of another beam change indication carried on a downlink control channel, such as the physical downlink control channel (PDCCH). The UE may receive the beam change indication on the downlink data channel and, in response, may transmit separate acknowledgement (ACK) feedback to the base station. Thus, reliability of acknowledging a beam change indication may be improved, e.g., as the UE may have at least two opportunities to transmit ACK feedback in response to a beam change indication.

In one aspect of the disclosure, a method, a computer-readable medium, and an apparatus are provided. The apparatus may be a UE or component thereof configured to receive, from a base station, a downlink transmission on a downlink data channel including data and an indication of a beam switch. The apparatus may be further configured to transmit first ACK feedback to the base station in response to reception of the data. The apparatus may be further configured to transmit second ACK feedback to the base station in response to reception of the indication of the beam switch, with the second ACK feedback being separate from the first ACK feedback.

In another aspect of the disclosure, a method, a computer-readable medium, and an apparatus are provided. The other apparatus may be a base station or component thereof configured to transmit, to a UE, a downlink transmission on a downlink data channel including data and an indication of a beam switch. The other apparatus may be further configured to receive first ACK feedback from the UE in response to transmitting the data. The other apparatus may be further configured to receive second ACK feedback from the UE in response to transmitting the indication of the beam switch, the second ACK feedback being separate from the first ACK feedback.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
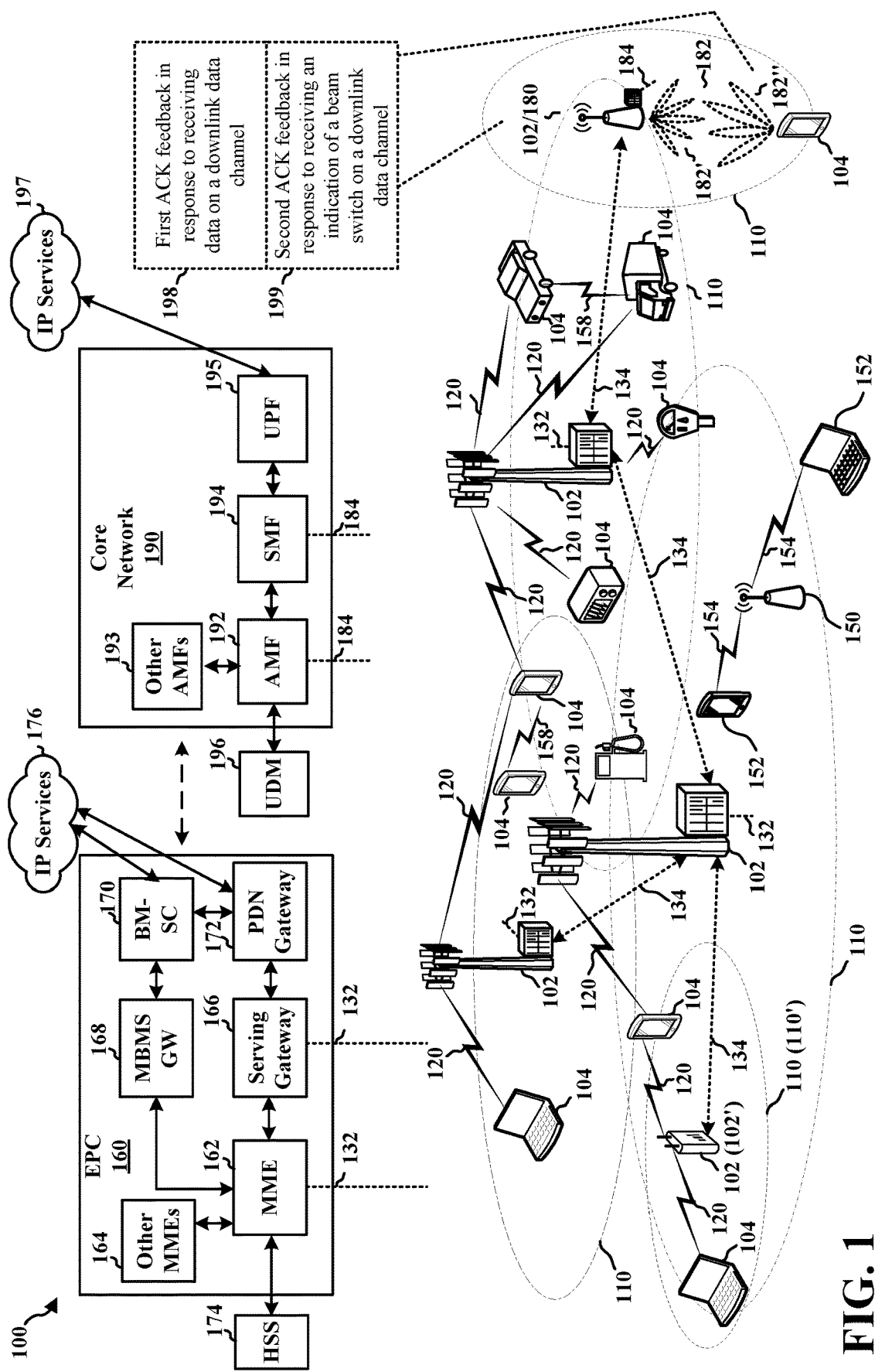
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

In an example radio access network (RAN), In various aspects, of the present disclosure, a base station may communicate with a user equipment (UE) using beamformed communication, such as in millimeter-wave (mmW) or near-mmW system. Beamforming may involve some degree of beam training, in which the base station and the UE find the best beams on which to communicate. Even though some beams identified via beam training may not be in active use at a given time, at least one of the UE and/or the base station may maintain a list of candidate beams, e.g., so that the UE and the base station may quickly respond to a blocked beam path or other interference.

The base station may control the beams on which the base station and the UE communicate, such as by informing the UE of the beam of the base station that is on which the base station will use for communication with the UE. Responsive to being configured with information indicating the base station beam to use, the UE may select or activate or move to a complementary beam identified during beam training as forming a pair with the base station beam.

The UE and the base station may then communicate using the complementary beam pair. However, channel conditions are inherently random and time-variant, and therefore, the channel quality of the beam pair on which the base station and the UE communicate may change over time, such as when blockers enter or leave the beam path, when the orientation of the UE is changed, and so forth.

As such changes have the potential to cause channel conditions to drop below acceptable threshold levels, the base station may configure the UE with a new base station beam to be paired with a new UE beam in order to form a complementary beam pair that sees an acceptable channel quality determine a new best beam to use for communication with the UE going forward.

Such a configuration of the UE by the base station may involve the transmission of some information indicative of the beam change. When the UE receives this beam change configuration information, the UE may activate or switch to a UE-side beam that is complementary to the base station-side beam, and the base station and the UE may communicate on that channel, e.g., until such time that the base station reconfigures the active beam pair.

Communication on wireless channels, however, carries with it some level of inherent risk, as the random nature of wireless channels may lead to failure of some signals from a transmitter to a receiver. Where those signals carry information configuring a beam pair that the base station will use, failure of the UE to receive those signals may result in radio link failure or loss of timing synchronization, as the UE may be unaware of the configuration change and so may continue using a stale beam.

As described herein, one solution to improve outcomes in these situations is to have the UE acknowledge reception of beam configuration information. Therefore, the UE may be configured to transmit acknowledgement (ACK) feedback to the base station in response to receiving the information indicating the beam change. The base station-side beam switch may be conditioned upon UE acknowledgement of that switch. However, the same issue arises in this direction: the potential for failure exists with the wireless communication of acknowledgement feedback the base station. Thus, a need exists to improve the reliability of acknowledging a beam change indication.

The present disclosure provides various techniques and solutions for improving the reliability of acknowledging a beam change indication, e.g., by transmitting the beam change indication on a downlink data channel, such as a physical downlink shared channel (PDSCH). For example, the base station may include the beam change indication in a medium access control (MAC) control element (CE) carried on the PDSCH. This beam change indication on the downlink data channel may be a repetition of another beam change indication carried on a downlink control channel, such as the physical downlink control channel (PDCCH). The UE may receive the beam change indication on the downlink data channel and, in response, may transmit separate ACK feedback to the base station. Thus, reliability of acknowledging a beam change indication may be improved, e.g., as the UE may have at least two opportunities to transmit ACK feedback in response to a beam change indication.

FIG. 1 is a diagram illustrating an example of a wireless communications system and an access network 100. The wireless communications system (also referred to as a wireless wide area network (WWAN)) includes base stations 102, UE 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR, which may be collectively referred to as Next Generation RAN (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which may be directly or indirectly (e.g., separated from an IAB donor by more than one hop) and/or one or more of the UEs 104, both of which may have communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive, from the base station 102/180, a downlink transmission on a downlink data channel including data and an indication of a beam switch. The UE 104 may transmit first ACK feedback 198 to the base station 102/180 in response to receiving the data. Further, the UE 104 may transmit second ACK feedback 199 to the base station 102/180 in response to receiving the indication of the beam switch, and the second ACK feedback 199 may be separate from the first ACK feedback 198.

Various other aspects and concepts are described herein in the context improving the reliability of beam switching between a UE and a base station.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Correspondingly, the base station 102/180 may be configured to transmit, to the UE 104, a downlink transmission on a downlink data channel including data and an indication of a beam switch. The base station 102/180 may then receive the first ACK feedback 198 from the UE 104 in response to transmitting the data. The base station 102/180 may further, receive the second ACK feedback 199 from the UE 104 in response to transmitting the indication of the beam switch. Again, the second ACK feedback may be separate from the first ACK feedback.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through DCI, or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100× is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The PDCCH carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARD) ACK/non-acknowledgement (NACK) feedback. The PUSCH carries data, and may additionally be used to carry a buffer status report (B SR), a power headroom report (PHR), and/or UCI.

Figure 3:
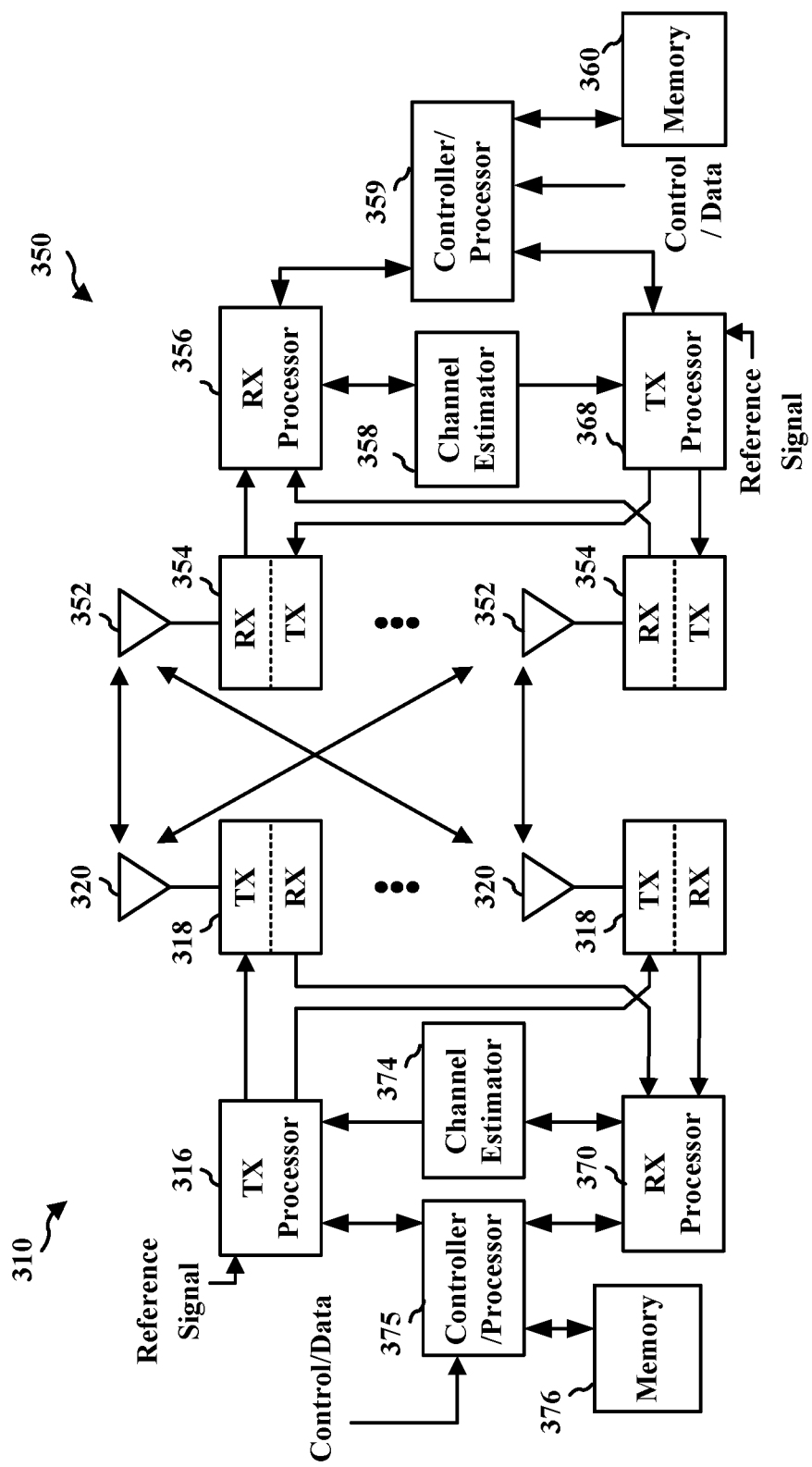
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a MAC layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with at least one of the data feedback 198 and/or the beam switch feedback 199 of FIG. 1.

In some other aspects, at least one of the TX processor 316, the RX processor 370, and the controller/processor 375 may be configured to perform aspects in connection with at least one of the data feedback 198 or the beam switch feedback 199 of FIG. 1.

Figure 4:
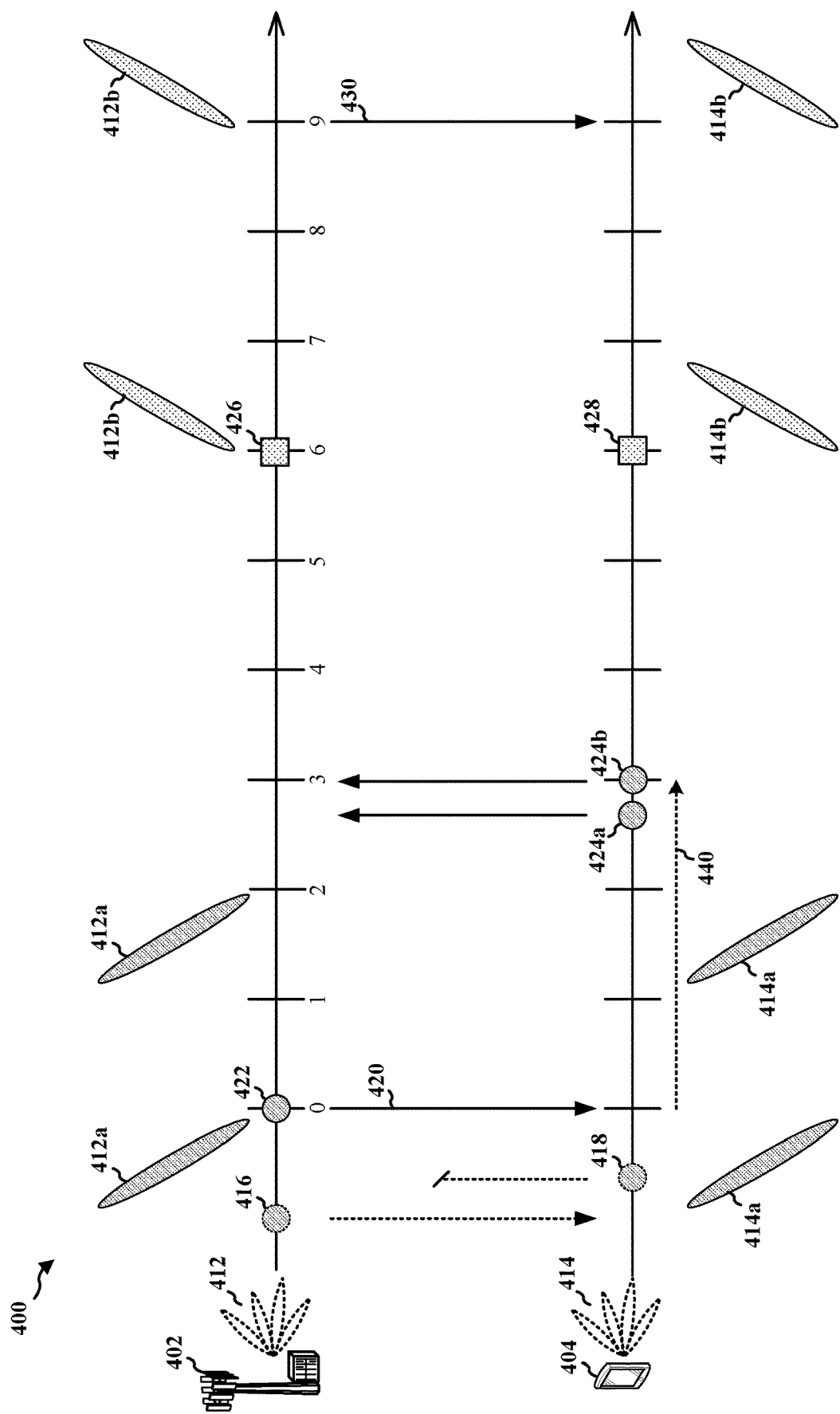
FIG. 4 is a diagram illustrating example communication between a base station and a UE in an access network.

With reference now to FIG. 4, a diagram illustrates example operations in an access network 400. In the access network 400, a base station 402 may be configured to communicate with a UE 404 using beamforming in a mmW or near-mmW system, such as FR2 of a 5G NR RAN. Accordingly, the base station 402 may generate or activate a set of beams 412, which may be TX beams used to transmit signaling to the UE 404. For example, the base station 402 may apply a spatial transmit filter. Similarly, the UE 404 may generate a set of beams 414, which may be RX beams used to receive signaling from the base station 402. For example, the UE 404 may apply a spatial receive filter.

In some aspects, the base station 402 may configure a set of available beams for the UE 404. For example, the base station 402 may transmit a set of transmission configuration indication (TCI) states to the UE 404, and each TCI state may correspond to a TX beam 412 that the base station 402 may use to transmit downlink signals to the UE 404. The UE 404 may pair at least one of the RX beams 414 with each of the available beams indicated by the base station 402, e.g., based on reference signals and/or SSBs respectively transmitted using one of the TX beams 412 and received using one of the RX beams 414.

The base station 402 may select one of the TX beams 412 as the "best" beam for communication with the UE 404. For example, the base station 402 may determine that a first TX beam 412a is the best beam to be used to transmit to the UE 404, e.g., based on CSI reporting and/or other feedback indicative of channel quality received from the UE 404. The UE 404 may use a corresponding first RX beam 414a to receive signaling transmitted by the base station 402 using the first TX beam 412a—that is, the UE 404 may pair the first RX beam 414a with the first TX beam 412a.

As conditions may change over time, the first TX beam 412a may no longer be the best beam for communication with the UE 404 at some point in the future. For example, the base station 402 may receive CSI reporting and/or other channel quality feedback that indicates the channel conditions (e.g., RSRP, SINR, etc.) associated with the first TX beam 412a are deteriorating. However, the base station 402 may additionally receive CSI reporting and/or other channel quality feedback that indicates the channel conditions associated with a second TX beam 412b are improving. Thus, the base station 402 may determine that downlink communication with the UE 404 should be switched to the second TX beam 412b, e.g., as the second TX beam 412b has become or is becoming the best beam.

In order to switch between the TX beams 412 used by the base station 402, the base station 402 should inform the UE 404 of the beam change to the second TX beam 412b. Further, the UE 404 should acknowledge the beam change to the base station 402 so that the base station 402 is aware that the UE 404 will be able to receive downlink transmissions after the beam switch. Thus, the base station 402 may be configured to transmit an indication of the beam change to the UE 404 and, correspondingly, the UE 404 may be configured to transmit ACK feedback that acknowledges the beam change.

In some aspects, the base station 402 may transmit one beam change indication 416 to the UE 404 on a downlink control channel (e.g., PDCCH), such as in reserved bits of DCI. The UE 404 may receive the beam change indication 416 or, potentially, may fail to receive the beam change indication 416 on the downlink control channel. When the UE 404 does receive the beam change indication 416 on the downlink control channel, the UE 404 may transmit ACK feedback 418 to the base station 402 in response to the beam change indication 416. For example, the UE 404 may transmit the ACK feedback 418 on an uplink control channel, such as a PUCCH.

However, the base station 402 may fail to receive the ACK feedback 418 responsive to the beam change indication 416 on the downlink control channel, e.g., due to poor channel conditions, blockers in the beam path, the UE 404 being nearly out of coverage, etc. Thus, the base station 402 may also be configured to transmit a beam change indication on a downlink data channel, such as a PDSCH. In some aspects, the beam change indication on the downlink data channel may be the same as the beam change indication 416 on the downlink control channel—that is, both beam change indications may indicate the same beam to which the base station 402 intends to switch.

In some aspects, the UE 404 may not always expect to receive a beam change indication on the downlink data channel. Therefore, the UE 404 may be configured with a set of parameters and/or the beam change on the downlink data channel may be activated at the UE 404. For example, the UE 404 may determine a set of parameters associated with a beam change indication on the downlink data channel and/or associated with acknowledging a beam change indication on the downlink data channel.

In some aspects, the UE 404 may determine the set of parameters based on information that is preconfigured at the UE 404. For example, the set of parameters may be stored in memory of the UE 404 according to one or more standards and/or specifications set by one or more standards organizations (e.g., 3GPP). In some other aspects, the UE 404 may determine the set of parameters based on information received from the base station 402. That is, the base station 402 may transmit information indicating the set of parameters to the UE 404, which may configure the UE 404 to receive and/or acknowledge a beam change indication on the downlink data channel.

By way of example, the set of parameters may indicate a configuration associated with repeated transmissions of ACK feedback responsive to receiving a beam change indication on the downlink data channel, such as a number of times the UE 404 is to transmit ACK feedback responsive to receiving a beam change indication on the downlink data channel. In another example, the set of parameters may indicate a set of resource on an uplink channel (e.g., PUCCH) on which the UE 404 is to transmit ACK feedback responsive to a beam change indication carried on the downlink data channel. In a further example, the set of parameters may indicate a format of an uplink control channel (e.g., PUCCH) on which the UE 404 is to transmit ACK feedback responsive to a beam change indication carried on the downlink data channel.

In addition, the UE 404 may determine that a beam change indication carried on the downlink data channel is active, and based thereon, the UE 404 may identify the beam change indication and respond accordingly. In some aspects, the base station 402 may transmit information activating the beam change indication on the downlink data channel to the UE 404. Thus, when the UE 404 receives such information from the base station 402, the UE 404 may be configured to identify the beam change indication and respond accordingly.

In the example access network 400, the beam change indication on the downlink data channel may be activated for the UE 404. Thus, when the base station 402 determines that the TX beam used for communication with the UE 404 should be switched from the first TX beam 412a to the second TX beam 412b, the base station 402 may generate a beam change indication 422, which may indicate the switch to the second TX beam 412b. For example, the beam change indication 422 may include information identifying the second TX beam 412b, such as a TCI state corresponding to the second TX beam 412b.

According to various aspects, the base station 402 may include the beam change indication 422 in a MAC control element (CE). The base station 402 may transmit a downlink transmission 420 to the UE 404 on the downlink data channel using the first TX beam 412a, and the downlink transmission 420 may include data and the MAC CE including the beam change indication 422.

The UE 404 may receive the downlink transmission 420 on the downlink data channel using the first RX beam 414a. Thus, the UE 404 may decode the data in the downlink transmission 420 and, further, may decode the beam change indication 422 included (in the MAC CE) on the downlink data channel. The UE 404 may then generate first ACK feedback 424a responsive to the data and may generate second ACK feedback 424b responsive to the beam change indication 422. For example, the UE 404 may generate information indicating a respective hybrid automatic repeat request (HARQ) ACK when the UE 404 successfully decodes the data and the beam change indication 422, or the UE 404 may generate a respective HARQ negative ACK (NACK) when the UE 404 fails to successfully decode the data and the beam change indication 422. Thus, in some aspects, each of the first and second ACK feedback 424a-b may indicate either an ACK or a NACK, depending upon whether the data and the beam change indication 422, respectively, is successfully decoded.

The UE 404 may subsequently transmit the first ACK feedback 424a to the base station 402 in response to receiving the data in the downlink transmission 420 on the downlink data channel. Further, the UE 404 may transmit the second ACK feedback 424b to the base station 402 in response to receiving the beam change indication 422 in the downlink transmission 420 on the downlink data channel. According to various aspects, the second ACK feedback 424b may be separate from the first ACK feedback 424a.

In one example, the second ACK feedback 424b may be separate from the first ACK feedback 424a in that the second ACK feedback 424b may be transmitted on a second set of resources that is different from a first set of resources on which the first ACK feedback 424a is transmitted. In another example, the second ACK feedback 424b may be separate from the first ACK feedback 424a in that the second ACK feedback 424b may be transmitted in a second format (e.g., PUCCH format) that is different from a first format in which the first ACK feedback 424a is transmitted.

In a further example, the second ACK feedback 424b may be separate from the first ACK feedback 424a in that the second ACK feedback 424b may be transmitted as a second type that is different from a first type as the first ACK feedback 424a is transmitted. Illustratively, the type with which the first and/or second ACK feedback 424a-b may be transmitted may include a set of sequences and/or mapping that may be associated with the uplink control channel (e.g., associated with the PUCCH and/or a format of the PUCCH) on which the first and/or second ACK feedback 424a-b may be transmitted.

In still another example, the second ACK feedback 424b may be separate from the first ACK feedback 424a in that the second ACK feedback 424b may be transmitted using a second transmission method different from a first transmission method used for transmitting the first ACK feedback 424a. Illustratively, the transmission method may refer to transmission of the first ACK feedback 424a and/or second ACK feedback 424b with or without repetition. In some aspects, the transmission method may refer to application of beam diversity (e.g., by using different beams) for transmission of the first ACK feedback 424a and/or second ACK feedback 424b, such as application of beam diversity to different repetitions of the second ACK feedback 424b. In some other aspects, the transmission method may refer to application of frequency diversity for transmission of the first ACK feedback 424a and/or second ACK feedback 424b, such as by using frequency hopping on repetitions of transmissions of the first ACK feedback 424a and/or the second ACK feedback 424b.

Responsive to receiving the beam change indication 422 (and/or the beam change indication 416 on the downlink control channel), the UE 404 may be configured to switch 428 to another one of the beams 414 that corresponds to the beam indicated by the beam change indication 422. For example, the UE 404 may identify the one of the beams 414 that corresponds (e.g., is paired with) the one of the base station beams 412 indicated by the beam change indication 422, such as by determining an index of one of the beams 414 that corresponds to a TCI state of one of the base station beams 412 indicated by the beam change indication 422. Illustratively, the UE 404 may determine that the second RX beam 414b corresponds to the second TX beam 412b that is identified in the beam change indication 422. The UE 404 may then switch to the second RX beam 414b in order to begin receiving downlink transmissions from the base station 402 using the second TX beam 412b.

In some aspects, the UE 404 may transmit a plurality of repetitions of the second ACK feedback 424b. Potentially, the UE 404 may transmit one or more repetitions of the second ACK feedback 424b by applying one of beam diversity (e.g., transmitting different repetitions using different TX beams of the UE 404) and/or frequency diversity (e.g., frequency hopping among repetitions of the second ACK feedback 424b). The UE 404 may determine the number of repetitions (as well as other information, such as beam diversity and/or frequency diversity) for transmission of the second ACK feedback 424b based on the determined set of parameters.

In some aspects, the UE 404 may delay transmission of at least the second ACK feedback 424b, e.g., by a delay period 440. In so doing, the UE 404 may be allotted a sufficient duration to switch 428 to the second RX beam 414b. In some aspects, the base station 402 may transmit information indicating the delay period 440 to the UE 404. In some other aspects, the delay period 440 may be preconfigured at the UE 404—e.g., the delay period 440 may be stored in memory of the UE 404 according to one or more standards and/or specifications set by one or more standards organizations (e.g., 3GPP). The UE 404 may initiate a timer for the delay period 440 at the end of the downlink transmission 420 (e.g., when no more resources are carrying data for the UE 404 on the downlink data channel), and the UE 404 may then transmit at least the second ACK feedback 424b after the timer reaches the delay period 440 or the timer set to the delay period 440 elapses.

Correspondingly, the base station 402 may receive the first ACK feedback 424a responsive to the data of the downlink transmission 420 and the second ACK feedback 424b responsive to the beam change indication 422 (included in the MAC CE) of the downlink transmission 420 on the downlink data channel. The base station 402 may switch 426 to the second TX beam 412b in response to receiving the second ACK feedback 424b. As the UE 404 may delay transmission of the second ACK feedback 424b for the delay period 440, the base station 402 may be configured to refrain from switching to the second TX beam 412b until after the second ACK feedback 424b is received following the delay period 440.

After the base station 402 switches 426 to the second TX beam 412b and the UE 404 switches 428 to the second RX beam 414b, the base station 402 may use the second TX beam 412b as the "current" beam and/or the "control" beam. For example, the base station 402 may transmit another downlink transmission 430 to the UE 404 using the second TX beam 412b, and the UE 404 may receive the other downlink transmission 430 using the second RX beam 414b.

Figure 5:
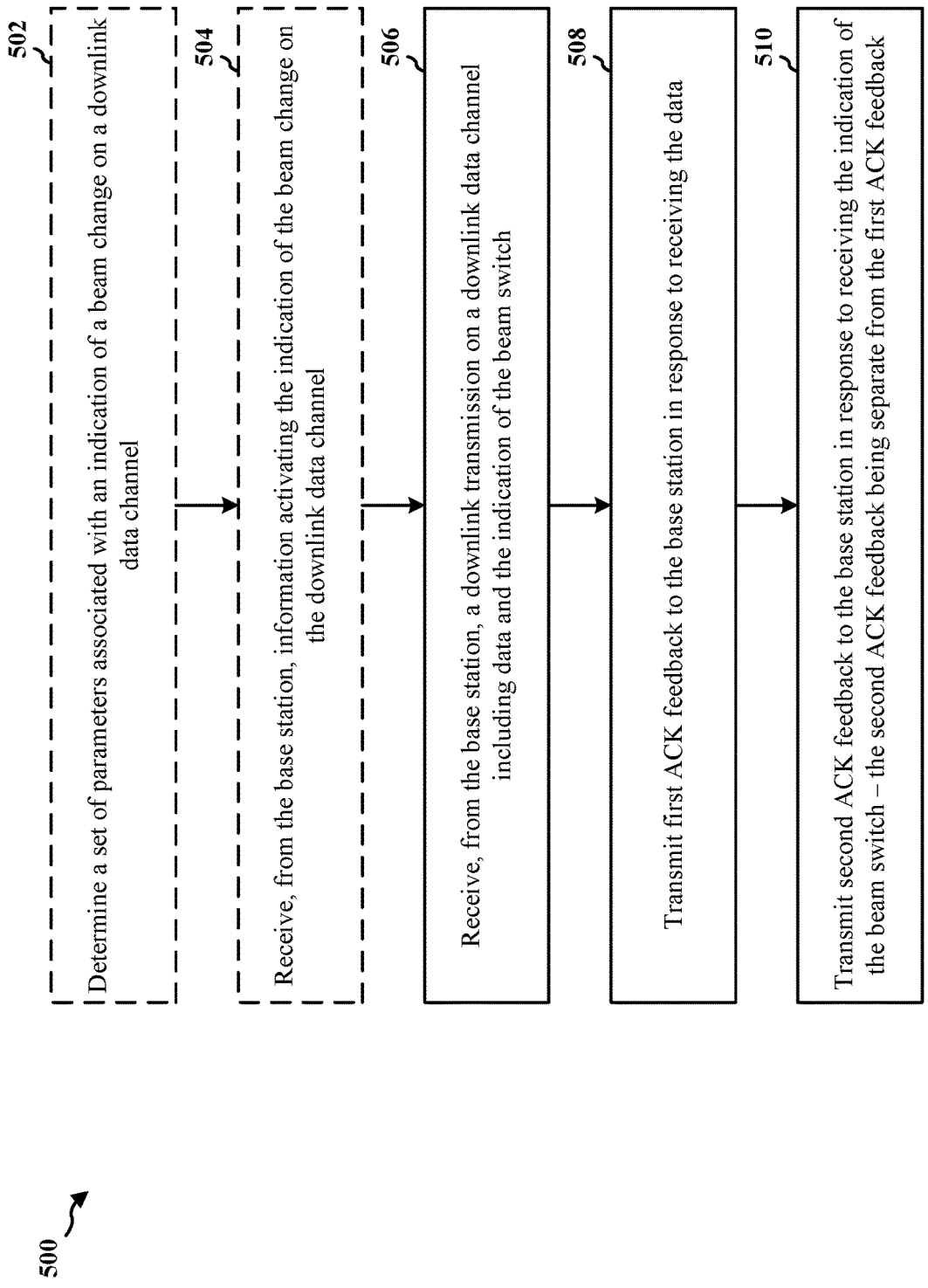
FIG. 5 is a flowchart of a method of wireless communication at a UE.

FIG. 5 is a flowchart of a method 500 of wireless communication. The method 500 may be performed by a UE (e.g., at least one of the UEs 104, 350, 404) and/or another apparatus (e.g., the apparatus 702). According to different aspects, one or more operations of the method 500 may be transposed, omitted, and/or contemporaneously performed.

At 502, the UE may determine a set of parameters associated with an indication of a beam change on a downlink data channel. For example, referring to FIG. 4, the UE 404 may determine a set of parameters associated with the second ACK feedback 424b responsive to the beam change indication 422 on the downlink data channel.

In some aspects, the UE may determine the set of parameters based on information that is preconfigured at the UE. For example, the set of parameters may be stored in memory of the UE according to one or more standards and/or specifications set by one or more standards organizations (e.g., 3GPP). The UE may determine the set of parameters by, determining whether the UE is configured to report ACK feedback for beam configuration or beam change information separately from ACK feedback. If the UE is configured for such separate ACK feedback reporting, the UE may access a set of data structures stored in memory of the UE and may load the data structures for use in communicating with a base station.

In some other aspects, the UE may determine the set of parameters based on information received from a base station. That is, the UE may receive, from the base station, information indicating the set of parameters, which may configure the UE to receive and/or acknowledge a beam change indication on the downlink data channel. The UE may receive the information indicating the set of parameters from the base station via RRC signaling or via the indication of the beam change when received on the downlink data channel.

By way of example, the set of parameters may indicate a configuration associated with repeated transmissions of ACK feedback responsive to receiving a beam change indication on the downlink data channel, such as a number of times the UE is to transmit ACK feedback responsive to receiving a beam change indication on the downlink data channel. In another example, the set of parameters may indicate a set of resources on an uplink channel (e.g., PUCCH) on which the UE is to transmit ACK feedback responsive to a beam change indication carried on the downlink data channel. In a further example, the set of parameters may indicate a format of an uplink control channel (e.g., PUCCH) on which the UE is to transmit ACK feedback responsive to a beam change indication carried on the downlink data channel.

At 504, the UE may receive, from the base station, information activating the indication of the beam change on the downlink data channel. Thus, when the UE receives such information from the base station, the UE may be configured to identify the beam change indication on the downlink data channel and respond accordingly. The UE may receive the information activating the beam change indication on the downlink data channel in DCI, which may be specific to the UE or common to a group of UEs. For example, referring to FIG. 4, the UE 404 may receive, from the base station 402, information activating the beam change indication on the downlink data channel to the UE 404.

At 506, the UE receive, from the base station, a downlink transmission on a downlink data channel including data and the indication of the beam switch. For example, the downlink data channel may be a PDSCH, and the indication of the beam switch may be included in a MAC CE on the PDSCH. In some aspects, the UE may receive the indication of the beam switch in the downlink transmission based on the information activating the beam change indication on the downlink data channel received from the base station. For example, referring to FIG. 4, the UE 404 may receive, from the base station 402, the downlink transmission 420 on the downlink data channel using the first RX beam 414*a*, and the downlink transmission 420 may include data and a MAC CE including the beam change indication 422.

At 508, the UE may transmit first ACK feedback to the base station in response to receiving the data on the downlink data channel. For example, referring to FIG. 4, the UE 404 may transmit, to the base station 402, the first ACK feedback 424*a* in response to receiving data of the downlink transmission 420 on the downlink data channel.

At 510, the UE may transmit second ACK feedback to the base station in response to receiving the indication of the beam switch. The second ACK feedback may be separate from the first ACK feedback. For example, the second ACK feedback may be included in a different message than the first ACK feedback. According to various aspects, the second ACK feedback may be transmitted on a second set of resources that is different from a first set of resources on which the first ACK feedback is transmitted, the second ACK feedback may be transmitted in a second format (e.g., PUCCH format) that is different from a first format in which the first ACK feedback is transmitted, the second ACK feedback may be transmitted as a second type that is different from a first type as the first ACK feedback is transmitted, and/or the second ACK feedback may be transmitted using a second transmission method different from a first transmission method used for transmitting the first ACK feedback.

According to various other aspects, the UE may transmit the second ACK feedback based on the determined set of parameters. For example, the UE may transmit the second ACK feedback more than once based on a number of repetitions indicated in the second ACK feedback, the UE may transmit the second ACK feedback on a set of resources (e.g., PUCCH resources) indicated by the set of parameters, and/or the UE may transmit the second ACK feedback using a format of an uplink control channel (e.g., PUCCH) indicated by the set of parameters.

According to some further aspects, the UE may transmit the second ACK feedback to the base station after a first time period that follows the downlink transmission on the downlink data channel. The first time period may be received from the base station, or the first time period may be preconfigured at the UE.

For example, referring to FIG. 4, the UE 404 may transmit the second ACK feedback 424*b* to the base station 402 in response to receiving the beam change indication 422 on the downlink data channel.

Figure 6:
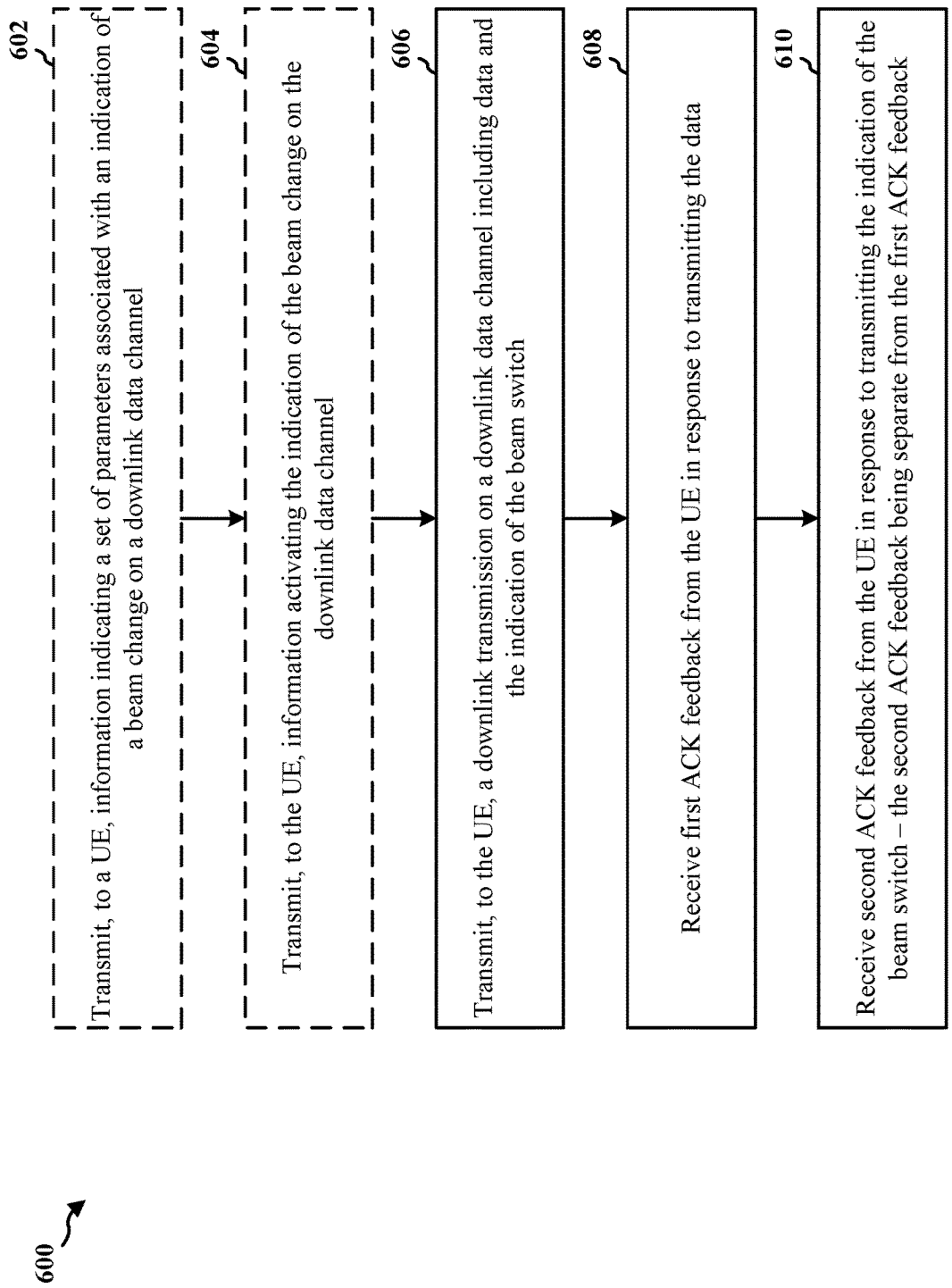
FIG. 6 is a flowchart of a method of wireless communication at a base station.

FIG. 6 is a flowchart of a method 600 of wireless communication. The method 600 may be performed by a base station (e.g., at least one of the base stations 102/180, 310, 402) and/or another apparatus (e.g., the apparatus 802). According to different aspects, one or more operations of the method 600 may be transposed, omitted, and/or contemporaneously performed.

At 602, the base station may transmit, to a UE, a set of parameters associated with an indication of a beam change on a downlink data channel. According to different aspects, the base station may transmit the set of parameters to the UE via one of RRC signaling or the indication of the beam change on the downlink data channel. For example, referring to FIG. 4, the base station 402 may transmit, to the UE 404, a set of parameters associated with the second ACK feedback 424*b* responsive to the beam change indication 422 on the downlink data channel.

By way of example, the set of parameters may indicate a configuration associated with repeated transmissions of ACK feedback responsive to receiving a beam change indication on the downlink data channel, such as a number of times the UE is to transmit ACK feedback responsive to receiving a beam change indication on the downlink data channel. In another example, the set of parameters may indicate a set of resources on an uplink channel (e.g., PUCCH) on which the UE is to transmit ACK feedback responsive to a beam change indication on the downlink data channel. In a further example, the set of parameters may indicate a format of an uplink control channel (e.g., PUCCH) on which the UE is to transmit ACK feedback responsive to a beam change indication on the downlink data channel.

At 604, the base station may transmit, to the UE, information activating the indication of the beam change on the downlink data channel. Thus, when the UE receives such information from the base station, the UE may be configured to identify the beam change indication on the downlink data channel and respond accordingly. The base station may transmit, to the UE, the information activating the beam change indication on the downlink data channel in DCI, which may be specific to the UE or common to a group of UEs. For example, referring to FIG. 4, the base station 402 may transmit, to the UE 404, information activating the beam change indication on the downlink data channel to the UE 404.

At 606, the base station may transmit, to the UE, a downlink transmission on a downlink data channel including data and the indication of the beam switch. For example, the downlink data channel may be a PDSCH, and the indication of the beam switch may be included in a MAC CE on the PDSCH. In some aspects, the base station may transmit the indication of the beam change in the downlink transmission based on the information activating the beam change indication on the downlink data channel, which may have been earlier transmitted to the UE. For example, referring to FIG. 4, the base station 402 may transmit, to the UE 404, the downlink transmission 420 on the downlink data channel using the first TX beam 412*a*, and the downlink transmission 420 may include data and a MAC CE including the beam change indication 422.

At 608, the base station may receive first ACK feedback from the UE in response to transmitting the data on the downlink data channel. For example, referring to FIG. 4, the base station 402 may receive, from the UE 404, the first ACK feedback 424*a* in response to transmitting data of the downlink transmission 420 on the downlink data channel.

At 610, the base station may receive second ACK feedback from the UE in response to transmitting the indication of the beam switch. The second ACK feedback may be separate from the first ACK feedback. For example, the second ACK feedback may be included in a different message than the first ACK feedback. According to various aspects, the second ACK feedback may be received on a second set of resources that is different from a first set of resources on which the first ACK feedback is received, the second ACK feedback may be received in a second format (e.g., PUCCH format) that is different from a first format in which the first ACK feedback is received, the second ACK feedback may be received as a second type that is different from a first type as the first ACK feedback is received, and/or the second ACK feedback may be received using a second transmission method different from a first transmission method used for transmitting the first ACK feedback.

According to various other aspects, the base station may receive the second ACK feedback from the UE based on the set of parameters. For example, the base station may receive the second ACK feedback more than once based on a number of repetitions indicated in the second ACK feedback, the base station may receive the second ACK feedback on a set of resources (e.g., PUCCH resources) indicated by the set of parameters, and/or the base station may receive the second ACK feedback according to a format of an uplink control channel (e.g., PUCCH) indicated by the set of parameters.

According to some further aspects, the base station may receive the second ACK feedback from the UE after a first time period that follows the downlink transmission on the downlink data channel. The first time period may be transmitted to the UE by the base station, or the first time period may be preconfigured at the UE.

For example, referring to FIG. 4, the base station 402 may receive the second ACK feedback 424*b* from the UE 404 in response to transmitting the beam change indication 422 on the downlink data channel.

Figure 7:
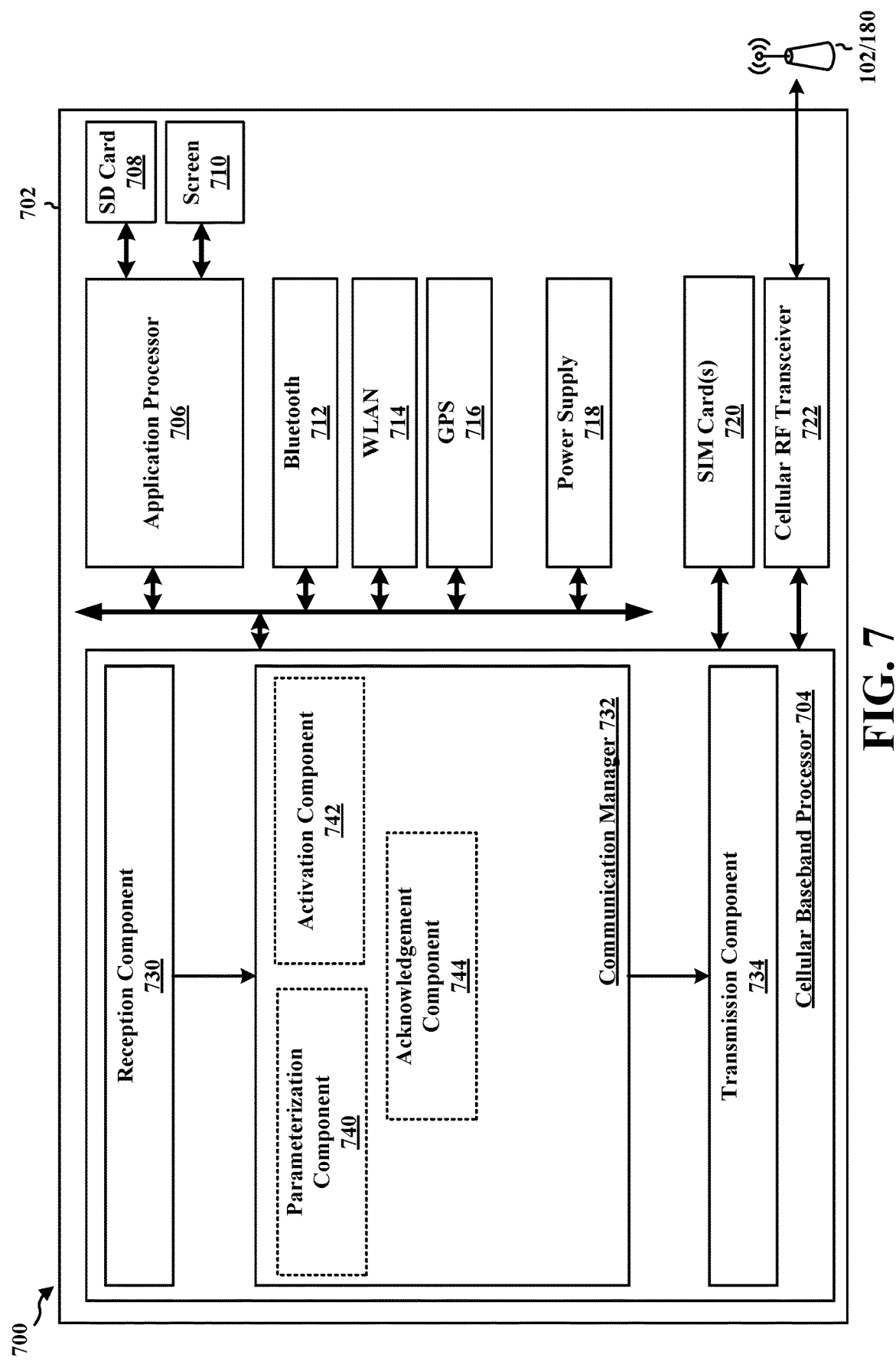
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or base station 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704.

In the context of FIG. 3, the cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., the UE 350 of FIG. 3) and include the aforediscussed additional modules of the apparatus 702. In one configuration, the cellular RF transceiver 722 may be implemented as at least one of the transmitter 354TX and/or the receiver 354RX.

The apparatus 702 may be configured to communicate signaling with a base station 102/180. To that end, the apparatus 702 may include a reception component 730 via which the apparatus 702 may receive signals, e.g., over the air on a wireless channel with the base station 102/180. The reception component 730 may provide data and/or control information from such received signals to the communication manager 732, which may be configured with a set of components that operate as further described infra.

In addition, the set of components with which the communication manager 732 is configured may generate some data and/or control information, as further described infra. The communication manager 732 may be operable to provide some or all of the data and/or control information to the transmission component 734, e.g., for transmission over the air to the base station 102/180. Specifically, the communication manager 732 may further include a parameterization component 740, an activation component 742, and an acknowledgement component 744.

The parameterization component 740 may be configured to determine a set of parameters associated with an indication of a beam change on a downlink data channel, e.g., as described in connection with 502 of FIG. 5. For example, the parameterization component 740 may determine the set of parameters based on information that is preconfigured at the apparatus 702. The parameterization component 740 may access a set of parameters stored in memory of the apparatus 702 according to one or more standards and/or specifications set by one or more standards organizations (e.g., 3GPP). The parameterization component 740 may determine the set of parameters by, determining whether the separate reporting is configured for ACK feedback for beam configuration or beam change information separately from ACK feedback. If configured for such separate ACK feedback reporting, the parameterization component 740 may access a set of data structures stored in memory of the apparatus 702 and may load the data structures for use in communicating with the base station 102/180, such as by providing the some or all determined parameters to the acknowledgement component 744.

In some other aspects, the parameterization component 740 may determine the set of parameters based on information received from the base station 102/180. That is, the parameterization component 740 may receive, from the base station 102/180 through the reception component 730, information indicating the set of parameters, which may the parameterization component 740 may use to configure the apparatus 702 to receive and/or acknowledge a beam change indication on a downlink data channel. The parameterization component 740 may receive the information indicating the set of parameters from the base station 102/180 via RRC signaling or via the indication of the beam change when received on the downlink data channel.

By way of example, the set of parameters may indicate a configuration associated with repeated transmissions of ACK feedback responsive to receiving a beam change indication on the downlink data channel, such as a number of times the acknowledgement component 744 is to transmit ACK feedback responsive to receiving a beam change indication on the downlink data channel. In another example, the set of parameters may indicate a set of resources on an uplink channel (e.g., PUCCH) on which the acknowledgement component 744 (e.g., through the transmission component 734) is to transmit ACK feedback responsive to a beam change indication carried on the downlink data channel. In a further example, the set of parameters may indicate a format of an uplink control channel (e.g., PUCCH) on which the acknowledgement component 744 (e.g., through the transmission component 734) is to transmit ACK feedback responsive to a beam change indication carried on the downlink data channel.

The activation component 742 may be configured to receive, through the reception component 730 from the base station 102/180, information activating the indication of the beam change on the downlink data channel, e.g., as described in connection with 504 of FIG. 5. Thus, when the acknowledgement component 744 receives (e.g., through the reception component 730) such information from the base station 102/180, the acknowledgement component 744 may be configured to identify the beam change indication on the downlink data channel and respond accordingly. The acknowledgement component 744 may receive the information activating the beam change indication on the downlink data channel in DCI, which may be specific to the apparatus 702 or common to a group of apparatuses.

The acknowledgement component 744 may be configured to receive (e.g., through the reception component 730), from the base station 102/180, a downlink transmission on a downlink data channel including data and the indication of the beam switch, e.g., as described in connection with 506 of FIG. 5. For example, the downlink data channel may be a PDSCH, and the indication of the beam switch may be included in a MAC CE on the PDSCH. In some aspects, the acknowledgement component 744 may receive the indication of the beam switch in the downlink transmission based on the information activating the beam change indication on the downlink data channel received from the base station 102/180.

The acknowledgement component 744 may be further configured to transmit (e.g., using the transmission component 734) first ACK feedback to the base station 102/180 in response to receiving the data on the downlink data channel, e.g., as described in connection with 508 of FIG. 5.

The acknowledgement component 744 may be further configured to transmit (e.g., using the transmission component 734) second ACK feedback to the base station 102/180 in response to receiving the indication of the beam switch, e.g., as described in connection with 510 of FIG. 5. The second ACK feedback may be separate from the first ACK feedback. For example, the second ACK feedback may be included in a different message than the first ACK feedback. According to various aspects, the second ACK feedback may be transmitted on a second set of resources that is different from a first set of resources on which the first ACK feedback is transmitted, the second ACK feedback may be transmitted in a second format (e.g., PUCCH format) that is different from a first format in which the first ACK feedback is transmitted, the second ACK feedback may be transmitted as a second type that is different from a first type as the first ACK feedback is transmitted, and/or the second ACK feedback may be transmitted using a second transmission method different from a first transmission method used for transmitting the first ACK feedback.

According to various other aspects, the acknowledgement component 744 may transmit (e.g., using the transmission component 734) the second ACK feedback based on the determined set of parameters. For example, the acknowledgement component 744 may transmit the second ACK feedback more than once based on a number of repetitions indicated in the second ACK feedback, the acknowledgement component 744 may transmit the second ACK feedback on a set of resources (e.g., PUCCH resources) indicated by the set of parameters, and/or the acknowledgement component 744 may transmit the second ACK feedback using a format of an uplink control channel (e.g., PUCCH) indicated by the set of parameters.

According to some further aspects, the acknowledgement component 744 may transmit the second ACK feedback to the base station 102/180 after a first time period that follows the downlink transmission on the downlink data channel. The first time period may be received from the base station 102/180, or the first time period may be preconfigured at the apparatus 702.

The apparatus 702 may include additional components that perform some or all of the blocks, operations, signaling, etc. of the algorithm(s) in the aforementioned flowchart of FIG. 5. As such, some or all of the blocks, operations, signaling, etc. in the aforementioned flowchart of FIG. 5 may be performed by a component and the apparatus 702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for receiving, from a base station, a downlink transmission on a downlink data channel including data and an indication of a beam switch; means for transmitting first ACK feedback to the base station in response to receiving the data; and means for transmitting second ACK feedback to the base station in response to receiving the indication of the beam switch, the second ACK feedback being separate from the first ACK feedback.

In one configuration, the downlink transmission includes a MAC CE that includes the indication of the beam switch.

In one configuration, the means for transmitting second ACK feedback to the base station in response to receiving the indication of the beam switch is configured to: transmit second ACK feedback to the base station in response to receiving the indication of the beam switch after a first time period following the downlink transmission on the downlink data channel.

In one configuration, the first time period is one of received from the base station or preconfigured at the UE.

In one configuration, the second ACK feedback is at least one of: transmitted on a second set of resources different from a first set of resources on which the first ACK feedback is transmitted, transmitted in a second format different from a first format in which the first ACK feedback is transmitted, transmitted as a second type different from a first type as the first ACK feedback is transmitted, or transmitted using a second transmission apparatus different from a first transmission apparatus used for transmitting the first ACK feedback.

In one configuration, the second ACK feedback is transmitted based on a set of parameters that includes at least one of: a configuration associated with repeated transmissions of the second ACK feedback, a set of resources on an uplink control channel that carries the second ACK feedback, or a format of the uplink control channel that carries the second ACK feedback.

In one configuration, the set of parameters is preconfigured at the apparatus 702.

In one configuration, the apparatus 702, and in particular the cellular baseband processor 704, includes means for receiving, from the base station, information indicating the set of parameters.

In one configuration, the information indicating the set of parameters is received via one of RRC signaling or the indication of the beam change.

In one configuration, the apparatus 702, and in particular the cellular baseband processor 704, includes means for receiving, from the base station, information activating the indication of the beam change on the downlink data channel.

In one configuration, the information activating the indication of the beam change on the downlink data channel is received via DCI that is one of specific to the UE or common to a group of UEs.

The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
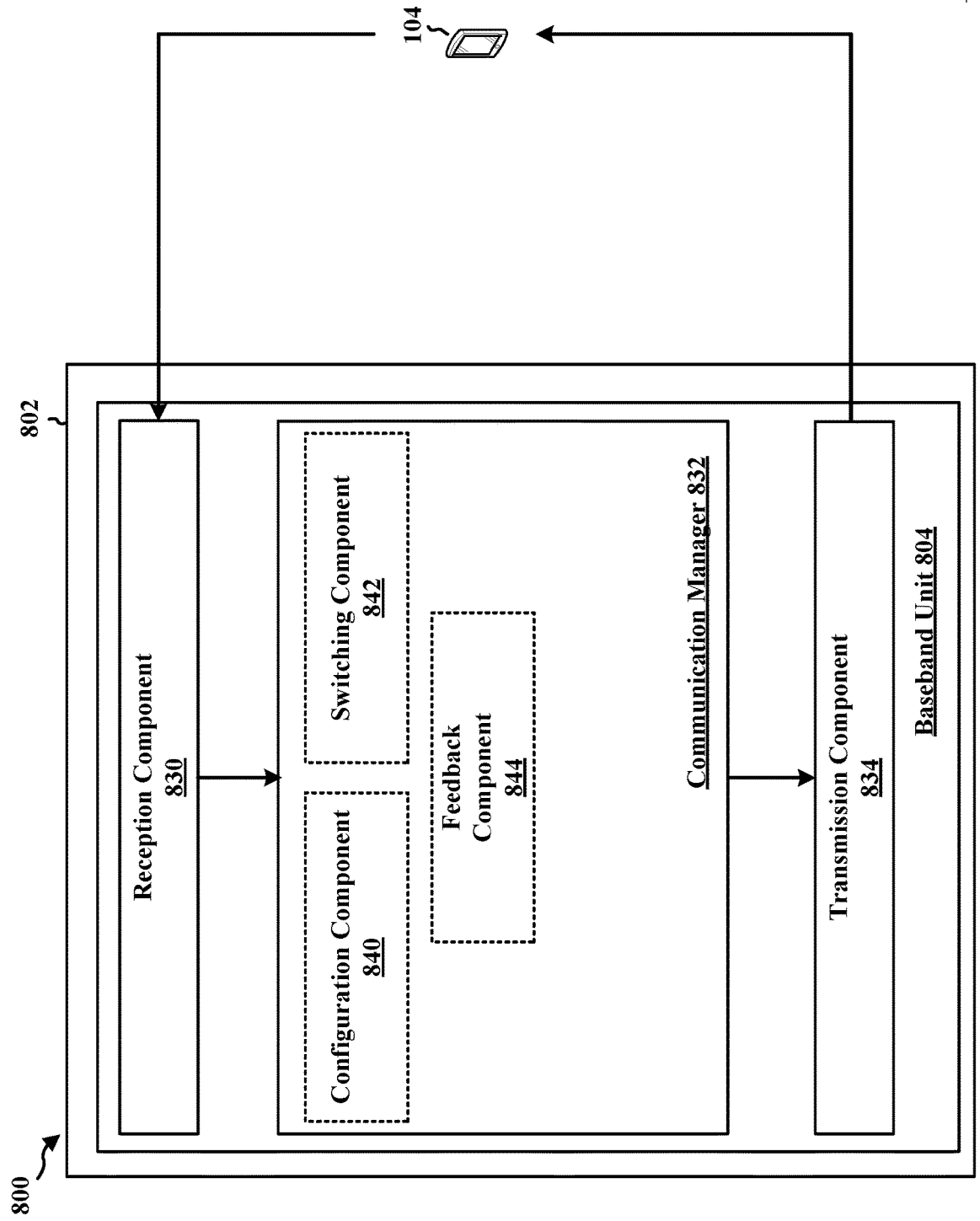
FIG. 8 is a diagram illustrating another example of a hardware implementation for another example apparatus.

FIG. 8 is a diagram 800 illustrating an example of a hardware implementation for an apparatus 802. The apparatus 802 may be a base station that includes a baseband unit 804. The baseband unit 804 may communicate through a cellular RF transceiver with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the base station 310 and may include the memory 376 and/or at least one of the TX processor 316, the RX processor 370, and the controller/processor 375.

The apparatus 802 may be configured to communicate signaling with a UE 104. To that end, the apparatus 802 may include a reception component 830 via which the apparatus 802 may receive signals, e.g., over the air on a wireless channel with the UE 104. The reception component 830 may provide data and/or control information from such received signals to the communication manager 832, which may be configured with a set of components that operate as further described infra.

In addition, the set of components with which the communication manager 832 is configured may generate some data and/or control information, as further described infra. The communication manager 832 may be operable to provide some or all of the data and/or control information to the transmission component 834, e.g., for transmission over the air to the UE 104. Specifically, the communication manager 832 may further include a configuration component 840, a switching component 842, and a feedback component 844.

The configuration component 840 may be configured to transmit (e.g., through the transmission component 834), to the UE 104, a set of parameters associated with an indication of a beam change on a downlink data channel, e.g., as described in connection with 602 of FIG. 6. According to different aspects, the configuration component 840 may transmit the set of parameters to the UE 104 via one of RRC signaling or the indication of the beam change on the downlink data channel.

By way of example, the set of parameters may indicate a configuration associated with repeated transmissions of ACK feedback responsive to receiving a beam change indication on the downlink data channel, such as a number of times the UE 104 is to transmit ACK feedback responsive to receiving a beam change indication on the downlink data channel. In another example, the set of parameters may indicate a set of resources on an uplink channel (e.g., PUCCH) on which the UE 104 is to transmit ACK feedback responsive to a beam change indication on the downlink data channel. In a further example, the set of parameters may indicate a format of an uplink control channel (e.g., PUCCH) on which the UE 104 is to transmit ACK feedback responsive to a beam change indication on the downlink data channel.

The configuration component 840 may be configured to transmit (e.g., through the transmission component 834), to the UE 104, information activating the indication of the beam change on the downlink data channel, e.g., as described in connection with 604 of FIG. 6. Thus, when the UE 104 receives such information from the apparatus 802, the UE 104 may be configured to identify the beam change indication on the downlink data channel and respond accordingly. The configuration component 840 may transmit, to the UE 104, the information activating the beam change indication on the downlink data channel in DCI, which may be specific to the UE 104 or common to a group of UE 104s.

The switching component 842 may be configured to transmit (e.g., through the transmission component 834), to the UE 104, a downlink transmission on a downlink data channel including data and the indication of the beam switch, e.g., as described in connection with 606 of FIG. 6.

For example, the downlink data channel may be a PDSCH, and the indication of the beam switch may be included in a MAC CE on the PDSCH. In some aspects, the switching component 842 may transmit the indication of the beam change in the downlink transmission based on the information activating the beam change indication on the downlink data channel, which may have been earlier transmitted to the UE 104.

The feedback component 844 may be configured to receive (e.g., through the reception component 830), first ACK feedback from the UE 104 in response to transmitting the data on the downlink data channel, e.g., as described in connection with 608 of FIG. 6.

The feedback component 844 may be configured to receive (e.g., through the reception component 830), second ACK feedback from the UE 104 in response to transmitting the indication of the beam switch, e.g., as described in connection with 610 of FIG. 6. The second ACK feedback may be separate from the first ACK feedback. For example, the second ACK feedback may be included in a different message than the first ACK feedback. According to various aspects, the second ACK feedback may be received on a second set of resources that is different from a first set of resources on which the first ACK feedback is received, the second ACK feedback may be received in a second format (e.g., PUCCH format) that is different from a first format in which the first ACK feedback is received, the second ACK feedback may be received as a second type that is different from a first type as the first ACK feedback is received, and/or the second ACK feedback may be received using a second transmission method different from a first transmission method used for transmitting the first ACK feedback.

According to various other aspects, the feedback component 844 may receive the second ACK feedback from the UE 104 based on the set of parameters. For example, the feedback component 844 may receive the second ACK feedback more than once based on a number of repetitions indicated in the second ACK feedback, the feedback component 844 may receive the second ACK feedback on a set of resources (e.g., PUCCH resources) indicated by the set of parameters, and/or the feedback component 844 may receive the second ACK feedback according to a format of an uplink control channel (e.g., PUCCH) indicated by the set of parameters.

According to some further aspects, the feedback component 844 may receive the second ACK feedback from the UE 104 after a first time period that follows the downlink transmission on the downlink data channel. The first time period may be transmitted to the UE 104 by the configuration component 840, or the first time period may be pre-configured at the UE 104.

The apparatus 802 may include additional components that perform some or all of the blocks, operations, signaling, etc. of the algorithm(s) in the aforementioned flowchart of FIG. 6. As such, some or all of the blocks, operations, signaling, etc. in the aforementioned flowchart(s) of FIG. 6 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for transmitting, to a UE, a downlink transmission on a downlink data channel including data and an indication of a beam switch; means for receiving first ACK feedback from the UE in response to transmitting the data; and means for receiving second ACK feedback from the UE in response to transmitting the indication of the beam switch, the second ACK feedback being separate from the first ACK feedback.

wherein the downlink transmission includes a MAC CE that includes the indication of the beam switch.

In one configuration, the means for receiving the second ACK feedback from the UE in response to transmitting the indication of the beam switch is configured to: receive second ACK feedback from the UE in response to transmitting the indication of the beam switch after a first time period following the downlink transmission on the downlink data channel.

In one configuration, the first time period is one of transmitted to the UE or preconfigured at the UE.

In one configuration, the second ACK feedback is at least one of: received on a second set of resources different from a first set of resources on which the first ACK feedback is received, received in a second format different from a first format in which the first ACK feedback is received, received as a second type different from a first type as the first ACK feedback is received, or received according to a second transmission apparatus different from a first transmission apparatus used for transmitting the first ACK feedback.

In one configuration, the second ACK feedback is received based on a set of parameters that includes at least one of a configuration associated with repeated transmissions of the second ACK feedback, a set of resources on an uplink control channel that carries the second ACK feedback, or a format of the uplink control channel that carries the second ACK feedback.

In one configuration, the apparatus 802, and in particular the baseband unit 804, includes means for transmitting, to the UE, information indicating the set of parameters.

In one configuration, the information indicating the set of parameters is transmitted via one of RRC signaling or the indication of the beam change.

In one configuration, the apparatus 802, and in particular the baseband unit 804, includes means for transmitting, to the UE, information activating the indication of the beam change on the downlink data channel.

In one configuration, the information activating the indication of the beam change on the downlink data channel is transmitted via DCI that is one of specific to the UE or common to a group of UEs.

The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other implementations or teachings described herein, without limitation.

Example 1 may be an apparatus at a UE configured to: receive, from a base station, a downlink transmission on a downlink data channel including data and an indication of a beam switch; transmit first ACK feedback to the base station in response to receiving the data; and transmit second ACK feedback to the base station in response to receiving the indication of the beam switch, the second ACK feedback being separate from the first ACK feedback.

Example 2 may include the apparatus of Example 1, and the downlink transmission includes a MAC CE that includes the indication of the beam switch.

Example 3 may include the apparatus of Example 1, and the transmission of second ACK feedback to the base station in response to receiving the indication of the beam switch includes to transmit second ACK feedback to the base station in response to receiving the indication of the beam switch after a first time period following the downlink transmission on the downlink data channel.

Example 4 may include the apparatus of Example 3, and the first time period is one of received from the base station or preconfigured at the UE.

Example 5 may include the apparatus of Example 1, and the second ACK feedback is at least one of: transmitted on a second set of resources different from a first set of resources on which the first ACK feedback is transmitted, transmitted in a second format different from a first format in which the first ACK feedback is transmitted, transmitted as a second type different from a first type as the first ACK feedback is transmitted, or transmitted using a second transmission apparatus different from a first transmission apparatus used for transmitting the first ACK feedback.

Example 6 may include the apparatus of Example 1, and the second ACK feedback is transmitted based on a set of parameters that includes at least one of: a configuration associated with repeated transmissions of the second ACK feedback, a set of resources on an uplink control channel that carries the second ACK feedback, or a format of the uplink control channel that carries the second ACK feedback.

Example 7 may include the apparatus of Example 6, and the set of parameters is preconfigured at the UE.

Example 8 may include the apparatus of Example 6, and further configured to receive, from the base station, information indicating the set of parameters.

Example 9 may include the apparatus of Example 8, and the information indicating the set of parameters is received via one of RRC signaling or the indication of the beam switch.

Example 10 may include the apparatus of Example 1, and further configured to receive, from the base station, information activating the indication of the beam switch on the downlink data channel.

Example 11 may include the apparatus of Example 10, and the information activating the indication of the beam switch on the downlink data channel is received via DCI that is one of specific to the UE or common to a group of UEs.

Example 12 may be an apparatus at a base station configured to: transmit, to a UE, a downlink transmission on a downlink data channel including data and an indication of a beam switch; receive first ACK feedback from the UE in response to transmitting the data; and receive second ACK feedback from the UE in response to transmitting the indication of the beam switch, the second ACK feedback being separate from the first ACK feedback.

Example 13 may include the apparatus of Example 12, and the downlink transmission includes a MAC CE that includes the indication of the beam switch.

Example 14 may include the apparatus of Example 12, and the reception of the second ACK feedback from the UE in response to transmitting the indication of the beam switch includes reception of second ACK feedback from the UE in response to transmitting the indication of the beam switch after a first time period following the downlink transmission on the downlink data channel.

Example 15 may include the apparatus of Example 14, and the first time period is one of transmitted to the UE or preconfigured at the UE.

Example 16 may include the apparatus of Example 12, and the second ACK feedback is at least one of: received on a second set of resources different from a first set of resources on which the first ACK feedback is received, received in a second format different from a first format in which the first ACK feedback is received, received as a second type different from a first type as the first ACK feedback is received, or received according to a second transmission apparatus different from a first transmission apparatus used for transmitting the first ACK feedback.

Example 17 may include the apparatus of Example 12, and the second ACK feedback is received based on a set of parameters that includes at least one of: a configuration associated with repeated transmissions of the second ACK feedback, a set of resources on an uplink control channel that carries the second ACK feedback, or a format of the uplink control channel that carries the second ACK feedback.

Example 18 may include the apparatus of Example 17, and further configured to transmit, to the UE, information indicating the set of parameters.

Example 19 may include the apparatus of Example 18, and the information indicating the set of parameters is transmitted via one of RRC signaling or the indication of the beam switch.

Example 20 may include the apparatus of Example 12, and further configured to transmit, to the UE, information activating the indication of the beam switch on the downlink data channel.

Example 21 may include the apparatus of Example 20, and the information activating the indication of the beam switch on the downlink data channel is transmitted via DCI that is one of specific to the UE or common to a group of UEs.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving, from a base station, a downlink transmission on a downlink data channel including data and an indication of a beam switch;
   transmitting first acknowledgement (ACK) feedback to the base station in response to receiving the data; and
   transmitting, on a same beam set as the first ACK feedback, second ACK feedback to the base station in response to receiving the indication of the beam switch, the second ACK feedback being separate from the first ACK feedback.

2. The method of claim 1, wherein the downlink transmission includes a medium access control (MAC) control element (CE) that includes the indication of the beam switch.

3. The method of claim 1, wherein the transmitting second ACK feedback to the base station in response to receiving the indication of the beam switch comprises:
   transmitting second ACK feedback to the base station in response to receiving the indication of the beam switch after a first time period following the downlink transmission on the downlink data channel.

4. The method of claim 3, wherein the first time period is one of received from the base station or preconfigured at the UE.

5. The method of claim 1, wherein the second ACK feedback is at least one of:
   transmitted on a second set of resources different from a first set of resources on which the first ACK feedback is transmitted,
   transmitted in a second format different from a first format in which the first ACK feedback is transmitted,
   transmitted as a second type different from a first type as the first ACK feedback is transmitted, or
   transmitted using a second transmission method different from a first transmission method used for transmitting the first ACK feedback.

6. The method of claim 1, wherein the second ACK feedback is transmitted based on a set of parameters that includes at least one of:
   a configuration associated with repeated transmissions of the second ACK feedback,
   a set of resources on an uplink control channel that carries the second ACK feedback, or
   a format of the uplink control channel that carries the second ACK feedback.

7. The method of claim 6, wherein the set of parameters is preconfigured at the UE.

8. The method of claim 6, further comprising:
   receiving, from the base station, information indicating the set of parameters.

9. The method of claim 8, wherein the information indicating the set of parameters is received via one of radio resource control (RRC) signaling or the indication of the beam switch.

10. The method of claim 1, further comprising:
    receiving, from the base station, information activating the indication of the beam switch on the downlink data channel.

11. The method of claim 10, wherein the information activating the indication of the beam switch on the downlink data channel is received via downlink control information (DCI) that is one of specific to the UE or common to a group of UEs.

12. A method of wireless communication at a base station, comprising:
    transmitting, to a user equipment (UE), a downlink transmission on a downlink data channel including data and an indication of a beam switch;
    receiving first acknowledgement (ACK) feedback from the UE in response to transmitting the data; and
    receiving, on a same beam set as the first ACK feedback, second ACK feedback from the UE in response to transmitting the indication of the beam switch, the second ACK feedback being separate from the first ACK feedback.

13. The method of claim 12, wherein the downlink transmission includes a medium access control (MAC) control element (CE) that includes the indication of the beam switch.

14. The method of claim 12, wherein the receiving the second ACK feedback from the UE in response to transmitting the indication of the beam switch comprises:
    receiving second ACK feedback from the UE in response to transmitting the indication of the beam switch after a first time period following the downlink transmission on the downlink data channel.

15. The method of claim 14, wherein the first time period is one of transmitted to the UE or preconfigured at the UE.

16. The method of claim 12, wherein the second ACK feedback is at least one of:
    received on a second set of resources different from a first set of resources on which the first ACK feedback is received,
    received in a second format different from a first format in which the first ACK feedback is received,
    received as a second type different from a first type as the first ACK feedback is received, or
    received according to a second transmission method different from a first transmission method used for transmitting the first ACK feedback.

17. The method of claim 12, wherein the second ACK feedback is received based on a set of parameters that includes at least one of:
    a configuration associated with repeated transmissions of the second ACK feedback, a set of resources on an uplink control channel that carries the second ACK feedback, or
a format of the uplink control channel that carries the second ACK feedback.

18. The method of claim 17, further comprising:
transmitting, to the UE, information indicating the set of parameters.

19. The method of claim 18, wherein the information indicating the set of parameters is transmitted via one of radio resource control (RRC) signaling or the indication of the beam switch.

20. The method of claim 12, further comprising:
transmitting, to the UE, information activating the indication of the beam switch on the downlink data channel.

21. The method of claim 20, wherein the information activating the indication of the beam switch on the downlink data channel is transmitted via downlink control information (DCI) that is one of specific to the UE or common to a group of UEs.

22. An apparatus for wireless communication by a user equipment (UE), comprising:
a memory; and
at least one processor coupled to the memory and configured to:
receive, from a base station, a downlink transmission on a downlink data channel including data and an indication of a beam switch;
transmit first acknowledgement (ACK) feedback to the base station in response to reception of the data; and
transmit, on a same beam set as the first ACK feedback, second ACK feedback to the base station in response to reception of the indication of the beam switch, the second ACK feedback being separate from the first ACK feedback.

23. The apparatus of claim 22, wherein the downlink transmission includes a medium access control (MAC) control element (CE) that includes the indication of the beam switch.

24. The apparatus of claim 22, wherein to transmit the second ACK feedback to the base station in response to reception of the indication of the beam switch, the at least one processor is configured to:
transmit second ACK feedback to the base station in response to reception of the indication of the beam switch after a first time period following the downlink transmission on the downlink data channel.

25. The apparatus of claim 24, wherein the first time period is one of received from the base station or preconfigured at the UE.

26. The apparatus of claim 22, wherein the second ACK feedback is at least one of:
transmitted on a second set of resources different from a first set of resources on which the first ACK feedback is transmitted,
transmitted in a second format different from a first format in which the first ACK feedback is transmitted,
transmitted as a second type different from a first type as the first ACK feedback is transmitted, or
transmitted using a second transmission apparatus different from a first transmission apparatus used for transmitting the first ACK feedback.

27. The apparatus of claim 22, wherein the second ACK feedback is transmitted based on a set of parameters that includes at least one of:
a configuration associated with repeated transmissions of the second ACK feedback,
a set of resources on an uplink control channel that carries the second ACK feedback, or
a format of the uplink control channel that carries the second ACK feedback.

28. An apparatus for wireless communication by a base station, comprising:
a memory; and
at least one processor coupled to the memory and configured to:
transmit, to a user equipment (UE), a downlink transmission on a downlink data channel including data and an indication of a beam switch;
receive first acknowledgement (ACK) feedback from the UE in response to transmission of the data; and
receive, on a same beam set as the first ACK feedback, second ACK feedback from the UE in response to transmission of the indication of the beam switch, the second ACK feedback being separate from the first ACK feedback.

29. The apparatus of claim 28, wherein the downlink transmission includes a medium access control (MAC) control element (CE) that includes the indication of the beam switch.

30. The apparatus of claim 28, wherein to receive the second ACK feedback from the UE in response to transmitting the indication of the beam switch, the at least one processor is configured to:
receive second ACK feedback from the UE in response to transmitting the indication of the beam switch after a first time period following the downlink transmission on the downlink data channel.

* * * * *